United States Patent Office 3,251,869
Patented May 17, 1966

3,251,869
POLYMERIC FATTY ACID COMPOSITION AND METHOD OF MAKING SAME
Stearns T. Putnam, Wilmington, and Rhoads M. Speck, Hockessin, Del., and Cyrus A. Weisgerber, Chadds Ford, Pa., assignors to Hercules Powder Company, Wilmington, Del., a corporation of Delaware
No Drawing. Filed Dec. 31, 1962, Ser. No. 248,252
10 Claims. (Cl. 260—407)

This invention relates to the manufacture of polymeric fatty acids and alkali metal soaps thereof.

A principal object of the invention is the preparation of polymeric fatty acids and especially dimerized fatty acids which are particularly useful as emulsifiers in the manufacture of synthetic rubber.

A further object of the invention is the provision of polymeric fatty acids and alkali metal soaps thereof which when used as emulsifiers in the manufacture of synthetic rubber give faster polymerization rates than previously known emulsifiers of this type.

A still further object of the invention is the provision of alkali metal soaps of dimerized fatty acids which when used as emulsifiers in the manufacture of synthetic rubber give rubber compounds which cure more rapidly than those made with previously known soaps of this type.

In accordance with the invention, it has now been discovered that polymeric fatty acids having improved utility in emulsifiers for the manufacture of synthetic rubber can be prepared from unsaturated fatty acids by heating the unsaturated fatty acids with iodine and a clay catalyst. The resulting product can then be saponified with alkali, e.g., hydroxides or carbonates of alkali metals such as sodium and potassium, to form soaps.

In the preparation of these polymerized fatty acid products, according to one procedure, the unsaturated fatty acids are first heated with from about 0.1% to about 2.0% by weight, based on the weight of fatty acids, of iodine. The iodine and/or iodine compounds formed during the heating are then preferably removed in any suitable manner and the resulting product heated with from about 1% to about 20%–25% by weight, based on the weight of fatty acids, of a clay catalyst. The clay catalyst is then removed and the resulting product utilized as such or saponified with alkali to form soaps.

In an alternative procedure, the heating of the unsaturated fatty acids is carried out in the presence of both the iodine and the clay catalyst utilizing the quantities of each set forth above. The iodine and/or iodine compounds and the clay catalyst can then be removed and the resulting product utilized as such or saponified with alkali to form soaps.

Having described the invention generally, the following examples are given to illustrate specific embodiments thereof. Parts are by weight unless otherwise specified. The fatty acid fractions utilized in the examples were obtained by the fractional distillation of tall oil and had the following analyses:

|  | Fatty acid fraction (1) | Fatty acid fraction (2) |
| --- | --- | --- |
| Acid number | 191.6 | 193.6 |
| Resin acids, percent | 4.4 | 1.7 |
| Fatty acids, percent | 92.3 | 95.6 |
| Unsaponifiables, percent | 3.7 | 1.5 |
| Iodine number | 135.0 | 125.5 |

EXAMPLE 1

One thousand parts of the above-described fatty acid fraction (1) and 3.0 parts of iodine were heated at 240° C. for 6 hours in a 3,000 ml. rocking autoclave at a pressure of <50 p.s.i. The crude product was then sparged with nitrogen at 240° C. for 1½ hours under vacuum (water aspirator) to remove iodine compounds.

Three hundred parts of the above product and 15 parts of "Super Filtrol," an acid-activated clay catalyst, were heated in a 1,300 ml. rocking autoclave at 230° C. for 4 hours under autogenous pressure (100 p.s.i. maximum). The product was filtered to remove the catalyst.

EXAMPLE 2

A portion of the crude iodine-treated fatty acid mixture made as described in Example 1 was distilled to give an 85.6% heart cut (forecut 1%, residue 13.1%, loss 0.3%). One hundred ninety-four parts of this heart cut and 9.7 parts "Super Filtrol" were heated in a 500 ml. rocking autoclave at 230° C. for 4 hours under autogenous pressure (480 p.s.i. maximum). The product was filtered to remove the catalyst.

EXAMPLE 3

As a control, 500 parts of a fatty acid fraction like that utilized in Example 1 and 25 parts of "Super Filtrol" were heated in a 1,300 ml. rocking autoclave at 230° C. for 4 hours under autogenous pressure (100 p.s.i. maximum). The product was filtered to remove the catalyst.

EXAMPLE 4

One thousand parts of the above-described fatty acid fraction (2) and 4.0 parts of iodine were heated at 240° C. for 6 hours in a rocking autoclave at a pressure of <50 p.s.i. The product was sparged with nitrogen at 240° C. for 1½ hours under vacuum (water aspirator) to remove iodine compounds. The loss during sparging was 3.0%.

Two hundred thirty-eight parts of the above product and 12 parts of "Super Filtrol" (dried overnight at 110° C.) were heated in a 1,050 ml. rocking autoclave for 4 hours at 230° C. under autogenous pressure (100 p.s.i. maximum). The product was filtered to remove the catalyst.

EXAMPLE 5

A portion of the crude iodine-treated fatty acid mixture made as described in Example 4 was distilled to give an 88.5% heart cut (forecut 0.7% and residue 10.8%). Two hundred two parts of this heart cut and 10 parts of "Super Filtrol" were heated at 230° C. for 4 hours in a 1,050 ml. rocking autoclave under autogenous pressure (100 p.s.i. maximum). The product was filtered to remove the catalyst.

EXAMPLE 6

As a control, 500 parts of the fatty acid fraction like that utilized in Example 4 and 25 parts of "Super Filtrol" (dried overnight at 110° C.) were heated at 230° C. for 4 hours in a 1,300 ml. rocking autoclave under autogenous pressure (100 p.s.i. maximum). It was determined that the dimerization reaction had leveled off after 1 hour. The product was filtered to remove the catalyst.

EXAMPLE 7

Each of the products produced as described in Examples 1–6 was converted directly into a dilute (2.34% concentration) soap solution. Each dilute solution was prepared from 3.64 ±0.01 g. of fatty acid dimer, 20 ml. 0.5 normal aqueous KOH, 15 ml. of electrolyte solution (8.4 g. $Na_3PO_4 \cdot 12H_2O$ and 1.68 g. Tamol N in sufficient distilled water to make 200 ml. of solution) and 135 ml. distilled water. This solution was boiled, cooled under nitrogen, the pH adjusted to 11.0 with 0.5 normal KOH and brought to a final weight of 241.5 g. with boiled distilled water.

Each of the soap solutions thus formed was evaluated as the emulsifier in SBR polymerization at 5° C. in comparison with a potassium soap of a disproportionated rosin (49% potassium dehydroabietate, A.N.=19.5 and T.S.=81.2%) as a control.

A standard 5° C. SFS polymerization recipe containing the following ingredients was used:

|  | Parts per 100 parts monomer | Grams reagent per 8-oz. bottle |
|---|---|---|
| Monomer: | | |
| Butadiene | 75 | 27 |
| Styrene | 25 | 9 |
|  | 100 | 36 |
| Soap-electrolyte solution: | | |
| Water | 200 | 72 |
| Emulsifier | 4.5 | 1.62 |
| Na₃PO₄·12H₂O | 0.500 | 0.180 |
| Tamol N | 0.100 | 0.036 |
| Ingredients in styrene: | | |
| Sulfole | 0.220 | 0.079 |
| p-Methane hydroperoxide | 0.040 | 0.0144 |
| Activator solution: | | |
| FeSO₄·H₂O | 0.020 | 0.0072 |
| Trisodium salt of ethylene diamine tetraacetic acid | 0.0294 | 0.0106 |
| Sodium formaldehyde sulfoxylate (SFS) | 0.036 | 0.0130 |

Polymerizations were carried out in duplicate in 8-oz. polymerization bottles. The bottles were purged with nitrogen and charged with SFS activator solution, soap-electrolyte solution and the Sulfole dissolved in styrene. The bottles were capped and placed in protective metal guards; butadiene was introduced from a special buret through a hypodermic needle. After cooling the bottles to 5° C. in an ice bath, the hydroperoxide-styrene and iron solutions were injected hypodermically. The contents were mixed, the bottles were pressurized with nitrogen to 15 pounds and were placed in a 5° C. polymerization bath. The polymerization was followed by withdrawing samples and determining the increase in weight due to the formation of polymer. The results are given in Table 1 and are expressed as hours required to give 60% conversion of the monomers to polymer.

*Table 1*

Emulsifier: Hr. to 60% conversion
- Product from Example 3 _____ 7.05
- Product from Example 1 _____ 6.25
- Product from Example 2 _____ 6.30
- Product from Example 6 _____ 7.30
- Product from Example 4 _____ 6.15
- Product from Example 5 _____ 6.90
- Potassium soap of disproportionated rosin (control) _____ 6.95

EXAMPLE 8

A portion of each of the products made as described in Examples 1–6 was evaluated for its effect on the physical properties of vulcanized rubber in comparison with a disproportionated rosin as the control. The control rosin and portions of the polymerized fatty acid products from Examples 1–6 were added to a master batch formulation consisting of the following ingredients:

Parts by weight
- Alcohol-coagulated polymer [1] _____ 93.96
- Micronex W-6 (channel black) _____ 40.0
- Zinc oxide NBS _____ 5.0
- Altax _____ 2.0
- Age-Rite powder _____ 1.0
- Sulfur NBS _____ 2.0
- Control rosin or fatty acids _____ 6.04

[1] Polymer obtained from latex which was coagulated with a salt-alcohol mixture. Organic acids from the emulsifier were soluble in the alcohol and were not retained by the coagulated rubber.

The preparation of the master batch and the addition of the acids was carried out as follows:

The polymer crumb was passed through the rolls of a two-roll laboratory mill at a mill opening of 0.008" and banded on rolls with a mill opening of 0.055". The carbon black was added at 125° F. (cooling water) and rubber milled until the black was completely dispersed. The other ingredients were added in the order given and the polymer crosscut six times after dispersal of each component. The acids were added to the master batch with the temperature of the rolls being 150° F. The stock was crosscut six times and end-rolled six times. The material was sheeted out and cured in closed laboratory rolls at 292° F. for 25, 50 and 100 minutes. Type C tensile specimens were cut from each sheet at each cure time. Physical properties of the rubber were determined according to ASTM D412–51T and –52T.

The physical properties of the rubber are set forth in Table 2, the values of modulus, tensile, elongation and shore hardness being tabulated for products of Examples 1–6 as units above or below (plus or minus) the corresponding values for the control. For example, under modulus for the product from Example 3 the figure —5 means that the modulus for this product was 5 units less than the corresponding modulus for the control.

*Table 2*

| Fatty acid used in emulsifier | Physical properties of rubber | | | | | | |
|---|---|---|---|---|---|---|---|
|  | Modulus | | | | Tensile 50' | Elong. 50' | Hardness Shore A 50' |
|  | 25' | 50' | 100' | Average | | | |
| Product from Example 3 | −5 | +10 | +30 | +5 | −115 | +5 | +3.0 |
| Product from Example 1 | −60 | +50 | +205 | +65 | −330 | −35 | +2.5 |
| Product from Example 2 | −20 | +70 | +210 | +87 | −365 | −35 | +4.0 |
| Product from Example 6 | +90 | +160 | +165 | +138 | +260 | −40 | +5.0 |
| Product from Example 4 | +85 | +240 | +285 | +203 | +70 | −75 | +4.0 |
| Product from Example 5 | +155 | +330 | +415 | +300 | +450 | −110 | +6.0 |

EXAMPLE 9

Five hundred parts of the above-described fatty acid fraction (2), 2.0 parts (0.4%) of iodine and 25 parts (5%) "Super Filtrol" were heated in a 1,000 ml. rocking autoclave for 4 hours at 230–240° C. and 175 p.s.i. autogenous pressure. The crude product was heated to 65° C. and centrifuged. The supernatant liquid was filtered to remove the clay catalyst. Three hundred eighty-one parts of this material was sparged with nitrogen at 240° C. for one hour under aspirator vacuum. The loss during sparging was 1.1%.

EXAMPLE 10

Five hundred parts of the above-described fatty acid fraction (2), 25 parts (5%) "Super Filtrol" and 1.5 parts (0.3%) KOH were heated in a 1,000 ml. rocking autoclave for 4 hours at 230° C. and an autogenous pressure of 120 p.s.i. The crude product was heated to 65° C., centrifuged and the supernatant liquid filtered as described in Example 9. Ultraviolet analysis showed that the material contained appreciable amounts of conjugated diene and triene fatty acids.

EXAMPLE 11

Eleven hundred parts of the above-described fatty acid fraction (2) and 4.4 parts (0.4%) of iodine were heated in a 3,000 ml. rocking autoclave for 6 hours at 240° C. During the reaction, the sample attained a maximum pressure of 75 p.s.i. The iodine catalyst was removed by sparging with nitrogen under aspirator vacuum for 2½ hours at 230–240° C. Loss in weight was 2.6%. Five hundred parts of the iodine-disproportionated fatty acids were heated with 25 parts (5%) of "Super Filtrol" and 1.5 parts (0.3%) of KOH at 230° C for 4 hours in a 1,000 ml. rocking autoclave. During the reaction, the pressure reached 60 p.s.i. The clay catalyst was removed by heating the crude product to 65° C. and centrifuging and filtering as described in Example 9.

The products of Examples 9, 10 and 11 were converted to soaps and tested for their polymerization activity and their effect on physical properties of SBR (styrene-butadiene rubber) utilizing the procedures and/or tests described in Examples 7 and 8. The results of these evaluations are set forth in Table 3 below.

from about 3 hours to about 4 hours. The pressure utilized in this reaction may vary from about atmospheric to about 5,000 pounds per square inch. However, autogenous pressure is preferred. Higher iodine concentrations are required for the lower pressures; lower concentrations are effective at higher pressures. Typical iodine-treated tall oil fatty acid fractions may contain from about 60–70% aleic acid, 10–15% dimerized fatty acids, 5–10% saturated and unsaturated $C_{16}$ and $C_{18}$ acids, 2–4% dehydroabietic acid, 2–4% unreacted polyunsaturated fatty acids and trace amounts of other fatty and resin acids.

Following the treatment with iodine, the fatty acids or fatty acids mixture is subjected to treatment to remove iodine or iodine compounds. This is desirably carried out by sparging the mixture with an inert gas such as nitrogen at temperatures from about 200° C. to about 260° C. and under vacuum for from about 1 hour to about 4 hours or until such products are substantially removed. Iodine and iodine compounds may also be removed in any other suitable manner as by sparging with steam at elevated temperatures, chemical treatment as by treatment with zinc, lead, copper or silver compounds to form nonvolatile, oil-insoluble iodines which can be separated by filtration, extraction, and so on.

*Table 3*

| Emulsifier | Polymerization activity | Physical properties of rubber | | | | | |
|---|---|---|---|---|---|---|---|
| | Hours to 60% conversion | Modulus | | | Tensile 50' | Percent elongation 50' | Hardness 50' |
| | | 25' | 50' | 100' | | | |
| Product from Example 9 | 6.2 | 370 | 930 | 1,480 | 3,810 | 645 | 52.5 |
| Product from Example 10 | (¹) | 330 | 885 | 1,330 | 3,885 | 665 | 49.5 |
| Product from Example 11 | 6.02 | 455 | 1,090 | 1,615 | 4,005 | 605 | 52.5 |
| Potassium soap of disproportionated rosin (Control) | 7.2 | 245 | 640 | 1,235 | 3,025 | 710 | 46.0 |

¹ 13% Conv. at 7.2 hrs.

The fatty acids used as the starting material in the preparation of the novel polymerized fatty acid products of the invention comprise unsaturated fatty acids having from about 16 carbon atoms to about 20 carbon atoms such as linolenic acid, eleostearic acid, linoleic acid, oleic acid, palmitoleic acid and ricinoleic acid. These may be used alone or in admixture with each other or with other unsaturated fatty acids and/or in mixtures with minor quantities of saturated fatty acids such as palmitic, stearic and the like. Such fatty acids or fatty acids mixtures may also include minor amounts of rosin acids, e.g., such as contained in fatty acids mixtures derived from tall oil. Preferred starting materials are fatty acid fractions obtained by the fractional distillation of tall oil and containing major quantities of unsaturated fatty acids such as oleic and linoleic in admixture with minor quantities of saturated acids such as stearic and palmitic and varying percentages of rosin acids. Typical tall oil fractions of this type may contain from about 30% to about 45% linoleic acid, from about 30% to about 45% oleic acid, from about 3% to about 10% saturated acids such as stearic and palmitic, from about 1% to about 10% rosin acids and minor percentages of various other acids. Other fatty acids mixtures suitable for use herein are those derived from soybean oil, linseed oil, cottonseed oil, safflower oils, the fish oils, and other oils containing unsaturated fatty acids.

In carrying out the process of the invention in accordance with the first procedure hereinabove described, the fatty acids used as starting material are first heated with from about 0.1% to about 2.0% or more of iodine, preferably from about 0.3% to 0.6% of iodine, at temperatures from about 200° C. to about 300° C., preferably from about 230° C. to about 250° C., and for a period of time from about 1 hour to about 6 hours, preferably After removal of the iodine and/or iodine compounds, the resulting mixture is heated at temperatures from about 180° C. to about 300° C., preferably from about 220° C. to about 240° C. in the presence of a crystalline clay catalyst for a period of time sufficient to effect substantial polymerization and preferably, primarily, dimerization of the unsaturated acids, including any remaining polyunsaturated acids. The time of reaction can vary from about 1 hour to about 6 hours, preferably from 3 hours to about 4 hours, depending upon the conditions of reaction employed. It is preferred to carry out this reaction at autogenous pressure which may be varied from atmospheric to about 5,000 pounds per square inch. The actual control of the polymerization step may be accomplished by noting the viscosity of the mixture undergoing treatment. When polymerization is complete, no further increase in viscosity occurs.

In the alternative procedure described hereinabove, the iodine and clay treatment are carried out simultaneously, the mixture of unsaturated fatty acids, iodine and clay being heated at temperatures from about 180° C. to about 300° C., preferably from about 220° C. to about 250° C., and for a period of time from about 1 hour to about 6 hours, preferably from about 3 hours to about 4 hours, or until the desired reactions take place. It is preferred to carry out this treatment at autogenous pressure which can be varied from atmospheric to about 5,000 pounds per square inch. Amounts of iodine can be the same as hereinabove described and the amounts of clay as hereinafter described.

In general, any of the crystalline clay minerals, either acid activated or alkaline, can be used as catalysts herein. Typical of the acid-activated clays are those obtained from montmorillonite, kaolinite, hectorite, attapulgite and the like. Particularly preferred among the acid-activated clay catalysts are the "Filtrols" which are defined in Handbook of Material Trade Names by Zimmerman and Lavine as follows: "Filtrol, a group of acid-activated adsorbents and catalysts made from the mineral montmorillonite $(MgCa)OAl_25SiO_2nH_2O$. They are supplied as fine white powders, 85–95% passing through a 200-mesh screen." The bentonite clays, particularly those containing at least 75% montmorillonite, are likewise quite satisfactory. The pH of the acid clays will be above 2 but below 7, and preferably from about 3–5.

Alkaline clays or mixtures of clays with from about 0.2–8.0% by weight, based on the weight of clay, of KOH, NaOH, $Ca(OH)_2$, $Ba(OH)_2$ or $Mg(OH)_2$ can also be used as catalysts herein. The available alkaline clays generally have a pH between about 7.2 and 8.8. They are crystalline montmorillonite bentonite clays, sold as a fine powder, 83% to 95% of which pass through a 200-mesh screen.

The amount of crystalline clay catalyst will largely depend upon the nature of the specific clay in question as well as other ingredients and conditions of reaction. In general, at least about 1% by weight, based on the weight of the fatty acids being treated, will be required. Usually, larger amounts are desirable to obtain satisfactory rates of reaction. Amounts up to about 20%–25% may be used although amounts of this order usually do not afford sufficient advantages to offset the added cost, increased difficulty of handling and removal, and so on.

The treatments herein described can be carried out under substantially anhydrous conditions with quite satisfactory results or, if desired, in the presence of a small amount, e.g., from about 1% to about 5% by weight, based on the weight of unsaturated acids, of water.

The clay catalyst is removed from the reaction mixture in any suitable manner as by filtration or centrifuging. The resulting polymeric fatty acid product, which typically may consist of from about 35–50% polymerized fatty acids (composed of dimer and higher molecular weight compounds) and 50–65% monomeric acids (composed of unreacted acids and acids formed during the dimerization), is then ready for use as such, e.g., by incorporation in an emulsion polymerization recipe and conversion to an alkali metal soap in situ, or can be converted into soaps which can also be used in emulsion polymerization processes. For example, a convenient and economical way to handle and use the products is to ship the free dimeric acids to a synthetic rubber plant. The rubber manufacturer can then prepare a dilute soap solution in the manner described in Example 7.

Another way to handle the products is in the form of solid soaps. These can be prepared from a paste (40–60% solids) either by spray drying to give a powder or by allowing the molten soap to solidify on a cold roll. Spray drying can be similar to known procedures for making rosin dry size or for the manufacture of soap powders. In both operations the nature of the solid soap will depend upon temperature and composition of the liquid soap, temperature and flow of air for removing water and the device for forming the spray. Soap chips and flakes can also be obtained by scraping the solidified soap from the cold roll. The soap flakes can be dried to the proper moisture content by passage through a tunnel dryer heated by steam coils and provided with circulating air.

In the use of the polymeric faty acids of the invention in emulsifiers for the manufacture of synthetic rubber, conventional procedures well known to the art can be used. Examples of suitable procedures and formulations can be found in U.S. Patents 2,648,655; 2,648,656; and 2,891,024. The amount of the product to be used can be varied but will usually be from about 3% to about 6% by weight, based on the weight of starting monomers.

It will thus be seen that the present invention provides a novel process for the preparation of polymeric fatty acids and alkali metal soaps thereof having particular utility as emulsifiers in the manufacture of synthetic rubber. When used for this purpose, these products give faster polymerization rates and cures than known products of this type. While preferred embodiments of the invention have been illustrated and described, the invention is not to be construed as limited to the particular details thereof except as they may be included in the following claims.

What we claim and desire to protect by Letters Patent is:

1. A polymeric fatty acid composition obtained by heating unsaturated fatty acids with from about 0.1% to about 2.0% by weight, based on the weight of fatty acids of iodine and from about 1% to about 25% by weight, based on the weight of fatty acids, of a crystalline clay catalyst at temperatures from about 180° C. to about 300° C. and at pressures from about atmospheric to about 5000 p.s.i. for a period of time from about 1 to about 6 hours.

2. A polymeric fatty acid composition obtained by heating unsaturated fatty acids with from about 0.1% to about 2.0% by weight, based on the weight of unsaturated fatty acids, of iodine and from about 1% to about 25% by weight, based on the weight of unsaturated fatty acids, of a crystalline clay catalyst at temperatures from about 180° C. to about 300° C. for a period of time from about 1 to about 6 hours, and then removing the iodine and catalyst.

3. An emulsifier comprising a soap selected from the group consisting of sodium and potassium soaps of unsaturated fatty acids and fatty acid mixtures containing unsaturated fatty acids, said soap being obtained by (1) heating a material selected from the group consisting of unsaturated fatty acids and fatty acid mixtures containing unsaturated fatty acids with from about 0.1% to about 2.0% by weight, based on the weight of said material, of iodine at temperatures from about 200° C. to about 300° C. for a period of time from about 1 hour to about 6 hours, (2) heating the thus treated material with a crystalline clay catalyst at temperatures from about 180° C. to about 300° C. for a period of time from about 1 hour to about 6 hours, and (3) saponifying the resulting product with a material selected from the group consisting of sodium potassium hydroxides and carbonates.

4. The method of preparing a polymeric fatty acid composition which comprises heating a material selected from the group consisting of unsaturated fatty acids and fatty acid mixtures containing unsaturated fatty acids with from about 0.1% to about 2.0% by weight, based on the weight of fatty acids, of iodine and from about 1% to about 25% by weight, based on the weight of fatty acids, of a crystalline clay catalyst at temperatures from about 180° C. to about 300° C. and at pressures from about atmospheric to about 5000 p.s.i., and substantially removing iodine, iodine compounds and the crystalline clay catalyst.

5. The method of preparing a polymeric fatty acid composition which comprises heating at temperatures from 200° C. to about 300° C., a material selected from the group consisting of unsaturated fatty acids and fatty acid mixtures containing unsaturated fatty acids with from about 0.1% to about 2.0% by weight, based on the weight of fatty acids, of iodine, heating the resulting mixture with from about 1% to about 25% by weight, based on the weight of fatty acids, of a crystalline clay catalyst at temperatures from about 180° C. to about 300° C. and at pressures from about atmospheric to about 5000 p.s.i. and substantially removing iodine, iodine compounds and the crystalline clay catalyst.

6. The method of claim 5 in which said material is a fatty acid mixture derived from tall oil.

7. The method of preparing a fatty acid soap which comprises heating a material selected from the group consisting of unsaturated fatty acids and fatty mixtures containing unsaturated fatty acids with from about 0.1% to about 2.0% by weight, based on the weight of fatty acids, of iodine and from about 1% to about 25% by weight, based on the weight of fatty acids, of a crystalline clay catalyst at temperatures from about 180° C. to about 300° C. and at pressures from about atmospheric to about 5000 p.s.i. substantially removing iodine, iodine compounds and the clay catalyst, and saponifying the resulting product with aqueous alkali.

8. The method of preparing a fatty acid soap which comprises heating at temperatures from 200° C. to about 300° C. a material selected from the group consisting of unsaturated fatty acids and fatty acid mixtures containing unsaturated fatty acids with from about 0.1% to about 2.0% by weight, based on the weight of fatty acids, of iodine, heating the resulting mixture with from about 1% to about 25% by weight, based on the weight of fatty acids, of a crystalline clay catalyst at temperatures from about 180° C. to about 300° C. and at pressures from about atmospheric to about 5000 p.s.i., substantially removing iodine, iodine compounds and the clay catalyst, and saponifying the resulting product with aqueous alkali.

9. The method of preparing a fatty acid soap which comprises heating a material selected from the group consisting of unsaturated fatty acids and fatty acid mixtures containing unsaturated fatty acids with from about 0.1% to about 2.0% by weight, based on the weight of the acids treated, of iodine, at temperatures from about 200° C. to about 300° C., treating the resulting mixture to effect substantial removal of iodine and iodine compounds, heating the thus treated mixture with from about 1% to about 25% by weight, based on the weight of fatty acids, of a crystalline clay catalyst at temperatures from about 180° C. to about 300° C. and at pressures from about atmospheric to about 5000 p.s.i., substantially removing the clay catalyst, and saponifying the resulting product with aqueous alkali.

10. The process of claim 9 in which said material is a fatty acid mixture derived from tall oil.

References Cited by the Examiner

UNITED STATES PATENTS

| | | | |
|---|---|---|---|
| 2,793,220 | 5/1957 | Barrett et al. | 260—407 |
| 2,876,203 | 3/1959 | Miller et al. | 260—407 X |

OTHER REFERENCES

Tatimori: Bull. of Chem. Soc. of Japan, vol. 16, (1941–42) pp. 75 to 81.

CHARLES B. PARKER, *Primary Examiner.*

ANTON H. SUTTO, *Assistant Examiner.*